Aug. 18, 1936.   L. P. F. VAN DER GRINTEN   2,051,584
METHOD OF MAKING COPIES WITH REDUCED SCREEN STRUCTURE
Filed Dec. 17, 1934
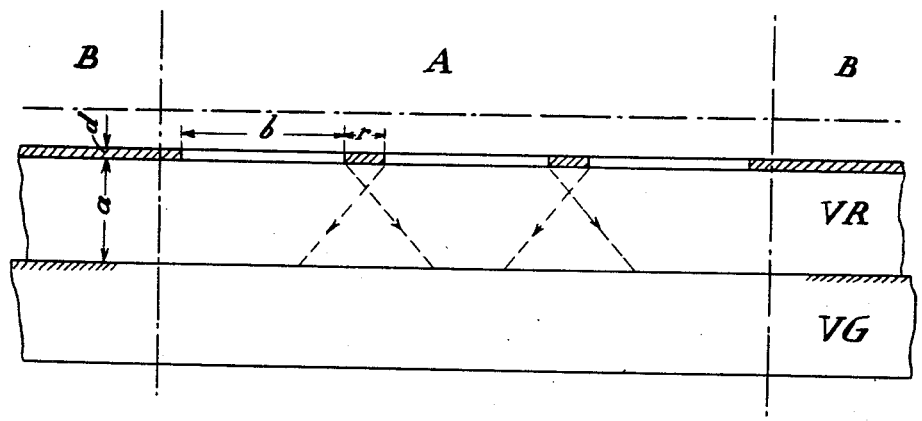
Inventor
L. P. F. Van der Grinten
By Wray N. Hoffman
Attorney Patented Aug. 18, 1936

2,051,584

UNITED STATES PATENT OFFICE 2,051,584

METHOD OF MAKING COPIES WITH REDUCED SCREEN STRUCTURE

Lodewijk Pieter Frans van der Grinten, Venlo, Netherlands, assignor to Naamlooze Vennootschap Chemische Fabriek L. van der Grinten, Venlo, Netherlands, a limited liability company of the Netherlands Application December 17, 1934, Serial No. 757,936
In the Netherlands December 20, 1933

4 Claims. (Cl. 95—5)

The invention relates to a method of copying photographic images having a screen structure whereby copies of such images with a reduced screen structure are produced.

Reflex copies and copies therefrom are by their nature more or less transparent, and are therefore reproducible both by means of transmitted radiation in the manner of contact printing, and by means of incident radiation and photographing—with or without a radiation-reflecting background—for example by means of a camera, and can likewise be viewed directly.

It is therefore possible to prepare copies from these reflex copies, and further copies from the said copies and so forth.

The photographic image having a screen structure from which a copy thereof with reduced screen structure is desired may be the original reflex copy, a copy of such reflex copy, a copy of the last-named copy, and so forth.

A copy will be termed positive when it corresponds to the original in regard to its subdivision into light and dark, and negative when it is opposite to the original in this respect. This nomenclature is quite independent of the fact as to whether a copy as such represents a positive or negative image. If, for example, a reflex copy of an original representing a negative image is prepared, then a copy made from the said reflex copy, and which likewise represents a negative image, will be called of course a positive copy.

Furthermore, hereinafter the parts of the original which upon uniform irradiation reflect a radiation of lesser strength (in general the dark parts) will be called the A-parts and the other parts the B-parts. Likewise, the image parts of the copies will be called A-parts or B-parts according as to whether they are copies of the original A-parts or B-parts of the original.

This differentiation is not meant to be absolute but relative. In the case of half-tones occurring in the original, the said half-tones may act as B-parts with respect to the darker places, but also as A-parts with respect to the lighter places.

This nomenclature is independent of the fact as to whether the original or the copies represent a negative or a positive image or are positive or negative.

In A-parts, to a greater extent than in B-parts, those regions which, in making the reflexion copy, were situated in regions of lesser activity of the incident radiation are more particularly distinguished. Hereinafter, such regions will be called "image-forming regions", while the other regions of the A-parts will be called the "residual regions".

The alternating of image forming regions and residual regions causes a "screen structure" in the A-parts corresponding to the subdivision of the radiation employed in making the reflex copy.

For the further simplification of the specification and claims, "observation" of a copy will hereinafter be regarded as equivalent to the copying by a direct positively working method. Consequently, hereinafter, in so far as no further mention is made of viewing, but only of copying and preparing, this is to be understood to mean that observing with the use of the methods described for copying and preparing, and the use of the said methods for observing are also included in the invention.

The expression "practically parallel radiation" employed hereinafter is to be regarded in a certain sense rather broadly, such that for example radiation from a point-form or substantially point-form source of light and at a distance which is not substantially greater than the dimensions of the system to be irradiated, is also included in the expression "practically parallel radiation". It is true that, at places situated at a considerable distance apart on the incidence surface of the irradiated system, the rays have different directions to one another, but at these places themselves and in their immediate vicinity on the incidence surface, practically rays of a definite direction only are involved.

In practice, it is extremely difficult and in many cases even practically impossible, without other means, to realize a perfectly parallel radiation (that is to say, one which has the same direction everywhere in all points) of sufficient intensity over large areas. The radiation, which for example is emitted by a point-form or substantially point-form source of light, such as for example an arc lamp at not too small a distance away, is therefore regarded for the present purposes with considerable approximation practically as parallel radiation, (at least in comparison with diffused radiation). Wherever, hereinafter, practically parallel radiation is prescribed for carrying out the invention, radiation in accordance with the foregoing meaning is suitable therefor. If the method with screen systems, composed of a plurality of elements, such as for example a system of a plurality of parallel lenticular element screens, is employed, perfect (that is to say reciprocal) parallelity of the rays may be desirable.

If linear screens are employed, and instead of a point-form source of radiation, a line or strip-form source of light, which is set up parallel or substantially parallel to the lines of the screen structure of the copy then, according to the foregoing—at least if the width of the source of radiation is relatively not too great—this radiation must also be regarded as practically parallel radiation. It is true that the rays in projection upon a plane perpendicular to the linear distribution, have different directions in respect of each other in lines situated at a considerable distance apart on the incidence surface of the system to be observed or to be copied, but in the said lines themselves and in their immediate vicinity on the incidence surface, practically only rays are concerned which have a definite direction in the above-mentioned projection. A point-form source of radiation, moving on a straight line is, always to be regarded as equivalent to a linear or strip-form source of radiation. The irradiation of a system having a linear screen structure on a cylindrical surface, which system is to be irradiated, is equivalent to a perfectly parallel radiation when the lines are parallel to the axis of the cylinder and the radiation takes place from this axis.

When hereinafter directions of incidence or angles of incidence or mean values thereof are given or are brought into relationship with each other, then the direction of incidence or the angle of incidence of the rays in corresponding places of the copies will always be meant. Preferably, the centre of the system will be taken as the place to which the directions or angles refer. When employing linear screens, the direction of incidence or the angle of incidence and the place are concerned in their projection upon a plane perpendicular to the lines of the screen structure.

The obtained reflex copies always have a screen structure. In positive reflex copies there are small light regions within the dark parts, in negative reflex copies there are dark residual regions within the lighter parts of the image.

It has been found that it is advantageous in the making of copies from photographic images having screen structure to reduce the screen structure.

Reduction of the screen structure in this connection is to be understood as meaning an extension of the image forming regions into the residual regions, or a reduction of the contrast between the image forming regions and residual regions, or in combination of both.

It has also been found that the reduction of the screen structure may be accompanied by or combined with an intensification of the image, but such reduction in many cases is also advantageous if such intensification is not obtained, or even in cases in which weakening of the strength of the image in one or the other copies is involved. In all cases the reduction or elimination of the screen structure has the advantage that a possibility of extra-intensification of the copies is thereby secured, which possibility does not exist to such a degree if the screen structure is retained.

It has been found that with the loss or reduction of the screen structure the residual regions may co-operate in an intensification. It is then for example possible in the copy itself and/or in copies subsequent thereto, to employ photochemical processes which cause or render possible an intensification. Such intensification can for example be obtained by means of negative or positive methods having an intensification action, by employing contrast-increasing developers and the like, by the known intensification methods, such as for example, in silver bromide photography, with the aid of mercury salts and the like, and by the known methods with intensifying intermediate layers, whose power of absorption is reduced by radiation and so forth.

Even if the copy obtained by copying from a photographic image with screen structure itself is weakened by the reduction of the screen structure, this can yet lead to intensification in further subsequent copies.

It is known that if the quantity of pigment per unit of area remains the same, a larger mean density is obtained according as to whether the pigment is more uniformly distributed. Reduction or elimination of the screen structure causes a more uniform distribution of the pigment in the dark parts of the image of a positive copy, and is therefore always advantageous if the copy made therefrom is positive.

In the light parts of the image of a negative copy the reduction of the screen structure removes dark spots therein.

Reduction of the screen structure is especially desirable if a copy is made from a reflex copy combined with a screen, otherwise the copy will reproduce the image and the screening together, and then no uniform distribution in the dark parts of the copy will be obtained.

Reduction of the screen structure may be obtained by controlling the radiation before, during or after passing through the copy from which a copy is to be made.

A control before passing the copy from which a copy is to be made consists for example in the use of a more or less diffused radiation, by which is to be understood a radiation from a plurality of directions which, however, need not at will deviate from the direction of incidence or main direction of incidence. This is obtained for example by movement of the source of radiation and the copy relatively to each other. Control after passing the copy from which a copy is to be made may be effected for example by providing a diffusing intermediate layer between the copy and the sensitive layer.

The reduction of the screen structure of course may take place, not only by the controlling of the direction of radiation, but also by a displacement of the copy and sensitive layer relatively to each other during the interval of exposure to radiation or by bleeding or stumping, or other mechanical treatments of the parts with screen structure. Removal or reduction of the screen structure is obtained, for example in phases in the gallate of iron or "ink" method, automatically in the bath which is employed for developing and/or fixing. Such a reduction of the screen structure is to be considered as equivalent to that obtained by control of the direction of radiation.

The methods for reducing the screen structure may advantageously be combined with methods for intensifying the image by control of the amount of radiation passing through the copy from which a copy is to be made. Such intensifying is often obtained by the use of practically parallel radiations with definite directions of incidence. Therefore, in some cases a combination of a practically parallel radiation in passing the copy from which a copy is to be made with diffusion after passing, is of advantage.

For instance, if a negative copy having a screen structure in the lighter parts has to be copied, the image containing layer of said copy being spaced from the sensitive layer, it is advantageous to subject the photographic image of the copy from which a copy is to be made to a radiation having the same direction as that of the radiation used in preparing said copy, so as to cause as little as possible interception of the radiation by the dark screen structure in the lighter parts of the copy. If the copy from which a copy is to be made consists of a system of image and screen parts with a relatively large covering factor, then a radiation which is diffused to a limited degree before passing the copy is of advantage. In this case, steps such as the use of more than one definite main direction of incidence may be employed.

Wherever, in the foregoing and in what follows, distances, for example between screen parts and image parts or between image parts of the copy from which a copy is to be made and the sensitive layer are mentioned, the thickness of the image parts, the thickness of the sensitive layer and so on are also to be taken into consideration for the distance.

"Copying" may be repeated several times, and different or the same steps according to the invention may be employed or repeated successively in different copying operations. As soon as, however, in a copy all screen structure has disappeared, the steps have no longer the effect according to the invention on the copies obtained from such copy.

An exemplification of the invention is shown in the accompanying diagrammatic drawing.

Example 1

A reflex copy is made from a drawing 50 x 50 centimetres on white non-transparent paper by means of a grainless or at least fine-grained silver bromide gelatine film effecting a rich contrast. The sensitive layer has a thickness ($d$) (see figure) of 0.01 millimetre, the cellulose support ($a$) a thickness of 0.10 millimetre. A linear covering screen of a coarseness of 0.16 and a covering factor of 0.8 is employed as a screen.

In the preparation of the reflex copy, the sensitive side of the silver bromide film is turned towards the screen. A powerful incandescent lamp with a clear bulb, located at a distance of 80 centimetres in the centre in front of the system to be irradiated, is employed as the source of radiation.

Radiation is continued until a negative reflex copy is obtained whose B-parts (B) have a mean optical density of between 1.5 and 2. After the usual development and fixing, this reflex copy now forms the negative copy (V. R.) for the subsequent copying operations. From the copy thus obtained a copy is made by copying. This copying is effected with a diffuse radiation, in such a manner that a non-mirror-image is produced, the distance ($a$) between the image parts and the sensitive layer of the subsequent copy (V. G.) being 0.10 millimetre (thickness of the cellulose support). Thereby, the screen structure in the resulting copy disappears entirely.

The sensitive material employed for the making of the copy is a transparent positively working diazo-type layer, which contains such a quantity of diazo-compound that it has neither an intensifying nor weakening action.

This structureless subsequent copy is now copied on to positive or negative material with an increase in contrast.

For example, it is copied on to diazo-type paper with the interposition of a transparent diazotype layer, the power of absorption of which is reduced by radiation, or upon a blue printing paper which gives a rich contrast.

It is also possible to copy on a directly intensifying sensitive layer, for example, a silver bromide layer. In this way, in one copying operation, an intensified positive end copy without screen structure is obtained.

If in preparing the reflex copy the covering factor of the screen had been smaller, for example 0.4, the screen structure could not have been removed completely as given above, in one phase. In that copying, copying with diffuse radiation and intermediate space is employed several times on subsequent copies until the screen structure has disappeared, after or during which the intensification can be carried out.

Example 2

A reflex copy from a drawing such as in Example 1 is made by means of a cellulose derivative foil 0.10 mm. thick provided on both sides with a negatively working blue print layer.

The screen employed is a crossed covering screen, that is to say a screen which may be regarded as made of two crossed line screens of a coarseness of 0.05 mm. and a covering factor of 0.75. An arc lamp with a clear glass globe at a distance of 80 centimetres in the centre in front of the system to be irradiated is employed as source of radiation.

After sufficient radiation, washing and so on, a negative reflex copy is obtained which serves as a copy for copying.

In this case, copying takes place with rays which are as parallel as possible in a system similar to that used in the preparation of the reflex copy.

The sensitive layer employed for making a copy has a panchromatic negatively working sensitive layer and radiation takes place with rays which are absorbed by the blue B-parts of the copy from which a copy is to be made.

Some space is provided between the copy and the sensitive layer.

Advantageously, the side of the copy which is turned towards the sensitive layer is rendered mat, for example by mechanical treatment with a rotating cylinder provided with abrasives or by passing over a heated cylinder having a mat surface and the like.

Advantageously also an intermediate diffusing layer is provided between the copy and sensitive layer.

Example 3

A reflex copy from a letter typed on both sides, with a heading printed in black, black-typed text and signature in black pencil is made as follows:

A vertical cylinder having a radius of 20 centimetres, in the axis of which an arc lamp, having a vertical arc and a clear glass globe, is moved up and down, serves as irradiation system.

The system to be irradiated consists of a single cylindrical lens screen having its focal lines spaced at 0.10 millimetre, a radius of cylinder of 0.10 millimetre and a thickness of the cellulose support of 0.25 millimetre.

Against the non-screened side of this system is placed a layer 0.05 millimetre in thickness, which on the side turned away from the screen consists of a layer of paradiazodimethyl-meta-toluidine 0.01 millimetre in thickness, that is to say, a layer whose power of absorption diminishes during radiation. Behind this layer is placed a transparent film of cellulose acetate 0.10 millimetre in thickness, which on the side facing the screen is provided, after saponification, with a layer about 0.01 millimetre in thickness of paradiazoethylbenzylanine. Behind this last named layer there is next placed the letter to be copied and behind this a piece of black velvet.

The whole system to be copied thus composed is passed over the cylinder of the radiation apparatus with the lens screen elements facing the source of radiation, in such a way that the lenticular elements of the screen are parallel to the axis of the cylinder.

The speed at which the system is passed over the cylinder is regulated in such a manner that an image of the letter on a colourless or substantially colourless background is obtained on the last named sensitive layer upon developing with a thin film of alkaline resorcinol solution.

The reflex copy thus obtained serves as a copy for subsequent copyings.

The copy is placed together with a highly glazed sheet of senitive diazotype paper of good quality in such a manner that its image side is turned away from the sensitive paper. Thus composed, this system is passed over the same radiation apparatus, with the image side turned towards the source of radiation, but now with the lines of the screen of the A-parts at right angles to the axis of the cylinder.

The speed at which the system is passed over the cylinder is regulated in such a manner as to produce an image on a white or substantially white background.

In the copy thus produced, the screen structure has disappeared, and the image is more intense than if, in copying, the screen had been parallel to the axis of the cylinder just as it was in preparing the reflex copy.

In the irradiation apparatus, the upwardly and downwardly moving arc lamp may be replaced by a tubular mercury vapour lamp, the axis of which coincides with that of the cylinder.

If an arc which is stationary in the cylinder is employed, then in the copying as above, the screen structure will not be removed or will only be removed insufficiently. It is then possible to subject the reflex copy, before copying, to a stumping treatment, for example by passing it between two rolls having different speeds of rotation with its screen lines parallel to the axis of such rolls.

A displacement of copy of which a copy is to be made and sensitive paper with respect to each other may be advantageously employed when the copy is to be applied to the sensitive paper in mirror image. The copy and sensitive paper are for this purpose placed together between two flexible, transparent webs and are allowed to move in succession over two cylindrical surfaces which in respect to the source of radiation are convex and concave, the lines of the screening being parallel to the axes of the cylinders.

It is also possible to proceed as follows:

The reflex copy is made in a printing frame set up vertically, with a vertical arc lamp, which if desired, is moved up and down in a vertical line or with a tubular lamp set up in the same line. The axes of the cylindrical lenses are parallel to this line.

After making the reflex copy, an intermediate copy is made of it on transparent material 0.08 millimetre in thickness, provided on both sides or through its entire body with positively working, sensitive diazo-type material employing an angle of incidence of for example 40° left, the picture layer of the reflex copy being turned towards the sensitive material.

An intensified copy of this copy which for this act of copying becomes the initial copy of which a copy is to be made can then be obtained, the other arrangements being the same, by radiating at an angle of incidence of 40° right, and the screen structure in as far as still present can be reduced or removed by interposing a diffusing layer between said copy and the sensitive layer.

What I claim is:—

1. The method of copying from a reflex copy which comprises arranging said reflex copy in a superposed position relative to a sensitive layer, providing a space between said reflex copy and said sensitive layer, said reflex copy being screened in those parts corresponding to the darker parts of the original from which it is made, said parts being made up of a plurality of small colored zones separated by small substantially non-colored regions between said zones, and causing a radiation to pass through said reflex copy on to said sensitive layer so that by the spacing between said reflex copy and said sensitive layer the radiation is spread to form in said sensitive layer a copy in which the portions corresponding to the said parts are dark and in which same portions the screening effect due to said zones and said regions is reduced, thereby forming a copy of increased strength of said reflex copy in said sensitive layer which copy is positive with regard to the original from which the reflex copy is made.

2. The method of copying from a reflex copy which comprises arranging said reflex copy in a superposed position relative to a sensitive layer, providing a space between said reflex copy and said sensitive layer, interposing in said space a diffusing layer, said reflex copy being screened in those parts corresponding to the darker parts of the original from which it is made, said parts being made up of a plurality of small colored zones separated by small substantially non-colored regions between said zones, and causing a radiation to pass through said reflex copy on to said sensitive layer so that the radiation is spread under the influence of said diffusing layer to form in said sensitive layer a copy in which the portions corresponding to the said parts are dark and in which same portions the screening effect due to said zones and said regions is reduced, thereby forming a copy of increased strength of said reflex copy in said sensitive layer which copy is positive with regard to the original from which the reflex copy is made.

3. The method of copying from a reflex copy which comprises arranging said reflex copy in a superposed position relative to a sensitive layer, providing a space between said reflex copy and said sensitive layer, said reflex copy being screened in those parts corresponding to the darker parts of the original from which it is made, said parts being made up of a plurality of small colored zones separated by small substantially non-colored regions between said zones, and causing a radiation which has a direction of incidence changing during the interval of exposure to pass through said reflex copy on to said sensitive layer so that by the spacing between said reflex copy and said sensitive layer the radiation is spread to form in said sensitive layer a copy in which the portions corresponding to the said parts are dark and in which same portions the screening effect due to said zones and said regions is reduced, thereby forming a copy of increased strength of said reflex copy in said sensitive layer which copy is positive with regard to the original from which the reflex copy is made.

4. The method of copying from a reflex copy which comprises arranging said reflex copy in a superposed position relative to a sensitive layer, providing a space between said reflex copy and said sensitive layer, said reflex copy being screened linearly in those parts corresponding to the darker parts of the original from which it is made, said parts being made up of a plurality of small colored linear zones separated by small linear substantially non-colored regions between said zones, and causing a radiation which has a direction of incidence changing during the interval of exposure in a plane perpendicular to the lines of the screening in said reflex copy to pass through said reflex copy on to said sensitive layer so that by the spacing between said reflex copy and said sensitive layer the radiation is spread to form in said sensitive layer a copy in which the portions corresponding to the said parts are dark and in which same portions the screening effect due to said zones and said regions is reduced, thereby forming a copy of increased strength of said reflex copy in said sensitive layer which copy is positive with regard to the original from which the reflex copy is made.

LODEWIJK PIETER FRANS
VAN DER GRINTEN.